United States Patent [19]

Renaud

[11] Patent Number: 4,524,856
[45] Date of Patent: Jun. 25, 1985

[54] CLUTCH RELEASE BEARING CONTROL MECHANISM

[75] Inventor: Pierre Renaud, Le Plessis-Trevise, France

[73] Assignee: VALEO, Paris, France

[21] Appl. No.: 388,162

[22] Filed: Jun. 14, 1982

[30] Foreign Application Priority Data

Jun. 18, 1981 [FR] France ............................. 81 12000

[51] Int. Cl.³ ............................................. F16D 23/14
[52] U.S. Cl. ........................................ 192/98; 29/434; 74/473 R; 192/99 S
[58] Field of Search .................. 192/82 R, 98, 99 A, 192/99 R, DIG. 1, 99 S; 29/434; 74/473 R

[56] References Cited

U.S. PATENT DOCUMENTS

| 1,345,327 | 6/1920 | Mason | 192/98 |
| 2,160,279 | 5/1939 | Olander | 192/82 R |
| 2,916,120 | 5/1959 | Turner | 192/82 R |
| 3,892,302 | 7/1975 | Rist | 192/99 A X |

FOREIGN PATENT DOCUMENTS 2935079  3/1981  Fed. Rep. of Germany .
 405789  1/1910  France .

Primary Examiner—Rodney H. Bonck
Attorney, Agent, or Firm—Charles A. Brown; Charles E. Brown

[57] ABSTRACT

A clutch release bearing control mechanism comprises a shaft and a yoke pivotally mounted on the shaft. A control arm rotates the yoke on the shaft. The yoke has an operative section in two separate parts, at least one of which is adjustable in position parallel to the axis of the shaft. Each part has on it a respective bearing area adapted to act axially on a respective area on a clutch release bearing. The areas on the clutch release bearing are at positions which are substantially diametrically opposed.

14 Claims, 2 Drawing Figures

CLUTCH RELEASE BEARING CONTROL MECHANISM

BACKGROUND OF THE INVENTION

1. Field of the invention

The present invention is generally concerned with clutch release bearing control yokes as used in particular in automotive vehicles.

2. Description of the prior art

As is well-known a clutch release bearing is designed to actuate the clutch release device of a clutch mechanism when the clutch release bearing is actuated by a control member usually referred to as a yoke. To this end, it generally comprises an actuator member which acts on the clutch release device and an operating member on which the control yoke acts, the actuator member being axially coupled to the operating member which comprises a transversely disposed bearing member for the control yoke to act on. This comprises a flange, which may be subdivided into two or more radial arms.

The clutch release bearing control yoke usually comprises a pivot section around which it pivots when actuated by a control arm and an operative section which is adapted to act axially on the clutch release bearing at two points thereon which are substantially diametrically opposed.

The control arm of this kind of control yoke may be integral with it, for example, the two being formed as a single component. This is usually the case when the support for the control yoke is of the ball and socket type.

As an alternative, the control yoke control arm may be separate to the control yoke. In practice, this is the case when the control yoke support is a pivot shaft, in which case the control arm and the control yoke may be moved apart along the pivot shaft and the control arm may extend at an angle to the shaft which is different to that for the control yoke.

Be that as is may, the control yoke control arm is designed to be coupled by a transmission system to a clutch pedal and, in order to act on the clutch release bearing at two points thereon which are substantially diametrically opposed, the operative section of the control yoke comprises two areas referred to hereinafter for convenience as bearing areas.

In practice, these bearing areas on the control yoke through which it acts on the clutch release bearing are usually formed at the ends of respective fingers, which together constitute the operative section of the control yoke.

At the present time these two fingers are usually rigidly connected together in a continuous manner to form a single part which is generally U-shaped in configuration.

The present invention is more particularly, but not exclusively, concerned with the case there the clutch release bearing is of the "pull" type, that is to say designed to apply traction to the clutch release device of the clutch mechanism, having part of its actuator member engaged behind the clutch release device.

For these clutch release bearings, the flange of the operating member on which the control yoke acts is spaced at some distance from the associated actuator member so that the operative section of the control yoke can apply traction to the flange, that is to say a force from the side of the latter towards the actuator member.

One of the problems to be overcome when assembling these "pull" type clutch release bearings results from the fact that this operation involves relative engagement of the clutch release bearing and the control yoke, the operative section of the latter having to be engaged transversely between the flange on the operating member of the clutch release bearing and the actuator member thereof.

In other words, the operative section of the control yoke must be engaged behind the transverse flange of the operating member of the clutch release bearing.

In the case of a "pull" type clutch release bearing supported by the clutch mechanism, part of its actuator member is engaged behind the clutch release device thereof. The control yoke is usually independently mounted on the casing of the gearbox, pivoting around a fixed support by virtue of its pivot section, this fixed support comprising a transverse shaft or ball and socket joint supported by the casing.

Thus, during the relative axial movement towards one another of the gearbox casing and the clutch mechanism, which is usually supported by the casing of the engine, it is necessary to progressively engage the operative section of the control yoke behind the transverse flange of the operating member of the clutch release bearing.

This operation involves offering up the control yoke in a position which is initially substantially flat or horizontal, the control yoke being progressively moved to a more vertical position as its operative section is engaged behind the transverse flange of the operating member of the clutch release bearing. This is a difficult operation, particularly when the control yoke is pivoted by means of a ball and socket connection, in view of the additional degrees of freedom in respect of its movement.

This operation may even prove impossible, as the pivoting movement of the control yoke necessary to move it to a vertical position requires a non-negligible dead space which is not always available.

To overcome this difficulty, it has been proposed to first mount the clutch release bearing on the control yoke, before mounting the clutch release bearing on the clutch release device of the clutch mechanism. Then, when moving the casing of the gearbox and the clutch mechanism axially closer together, the clutch release bearing is automatically "snapped" onto the clutch release device of the clutch mechanism, working blind.

The arrangements used for this purpose do not favor subsequent dismantling, however.

It has been proposed to engage the control yoke transversely on the clutch release bearing, after the relative axial movement towards one another of the gearbox casing and clutch mechanism, without the control yoke being mounted on the casing beforehand.

This solution is not acceptable in practice unless the support for the control yoke on the gearbox casing is external to the casing.

If this support is a ball and socket joint, it is still acceptable for the ball and socket joint to be inside the gearbox casing. In practice, however, the control yoke must then be formed with an opening to permit its engagement on the ball and socket joint, in the vicinity of the housing with which it must cooperate. This is prejudicial to the mechanical strength of the control yoke.

It has been further proposed to provide a pivoting, bayonet or quarter-turn type mounting of the clutch release bearing on the control yoke.

In practice, this solution is suited only to vehicles where the gearbox casing is readily accessible.

In the case of touring automobiles the necessary space is not always available.

German patent application No. 29 35 079 proposes subdividing the control yoke into two separate parts, to be pivoted together scissors-fashion.

This scissors type pivoting means that the parts must overlap one another at the pivot point, however.

This is practicable only if the parts are flat, but they then have insufficient stiffness in the axial direction, perpendicular to their plane, this being the direction in which they act on the clutch release bearing.

If they are of channel section, in order to increase their stiffness, it becomes difficult to overlap them at the pivot point, unless they are asymmetrical. In this case, they would not have the same stiffness and they would not act equally on the clutch release bearing, having an overall detrimental effect.

A general objective of the invention is to provide a device which overcomes the aforementioned disadvantages in providing a very simple solution to the problems discussed.

SUMMARY OF THE INVENTION

The invention consists in a clutch release bearing control mechanism comprising a shaft, a yoke having a pivot section pivotally mounted on said shaft, and a control arm for rotating said yoke on said shaft, said yoke further having an operative section in two separate parts, at least one of which is adjustable in position parallel to the axis of said shaft, each of said separate parts having on it a respective bearing area adapted to act axially on a respective area on a clutch release bearing, said areas on said clutch release bearing being at positions thereon which are substantially diametrically opposed.

Preferably, and in practice always, the two parts constituting the control yoke in accordance with the invention are both mounted so as to be movable transversely relative to one another.

For example, a sleeve may be keyed to the shaft and adjustable in position axially thereon, one of the separate parts of the operative section being mounted on the sleeve and the other on the shaft, itself mounted so as to slide parallel to its axis.

Be this as it may, the fitting of the control yoke in accordance with the invention to the associated clutch release bearing is particulaly easy even when, in the case of a "pull" type clutch release bearing, it must mount behind the flange or other bearing member provided for this purpose on the operating member of the clutch release bearing.

The invention further consists in a method for carrying out this assembly.

In the aforementioned method of engaging an axially mobile clutch release bearing of a clutch mechanism with a control yoke of a control mechanism comprising a shaft, a yoke having a pivot section pivotally mounted on said shaft, and a control arm for rotating said yoke on said shaft, said yoke further having an operating section in two separate parts, at least one of which is adjustable in position parallel to the axis of said shaft, each of said separate parts having on it a respective bearing area adapted to act axially on a respective area on a clutch release bearing, said areas on said clutch release bearing being at positions thereon which are substantially diametrically opposed, said shaft being supported by a gearbox casing, with said casing and said clutch mechanism axially spaced from one another, at least one of said separate parts is moved parallel to the axis of said shaft so that it is transversely offset from the path through which said clutch release bearing moves when said clutch mechanism and said casing are moved axially towards one another, and then said separate part is moved in the opposite direction into engagement with said clutch release bearing.

This assembly method does not cause any problems, even in a congested environment.

Other objects and advantages will appear from the following description of an example of the invention, when considered in connection with the accompanying drawing, and the novel features will be particularly pointed out in the appended claims.

DESCRIPTION OF THE PREFERRED EMBODIMENT

Figure 1:
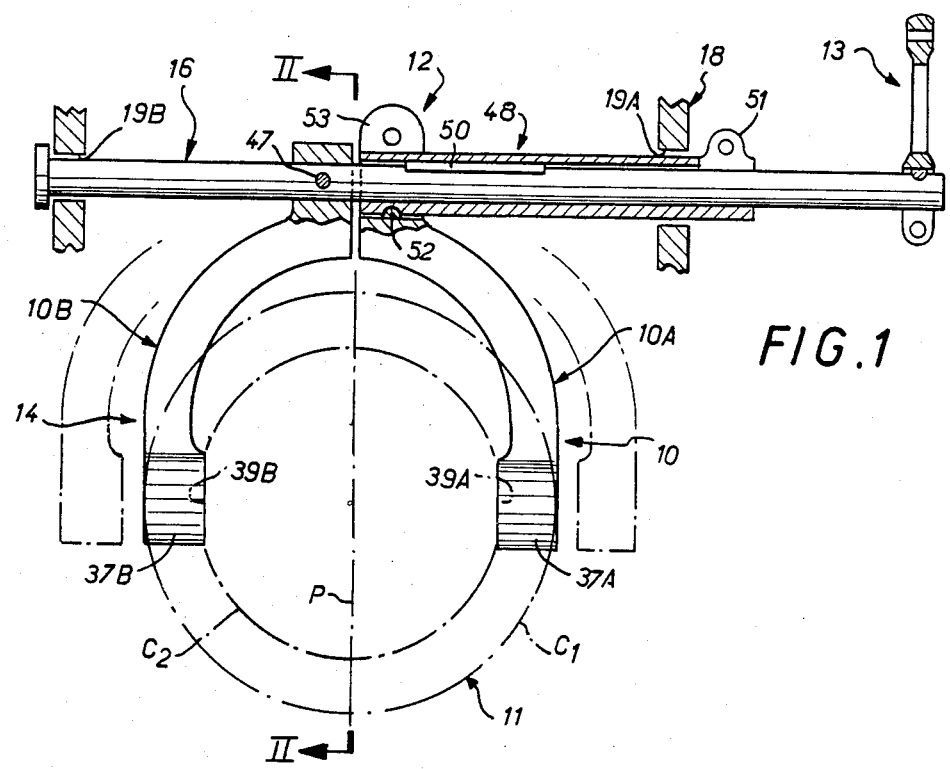
FIG. 1 is a partially cutaway view in elevation of a clutch release bearing control yoke in accordance with the invention.

As shown in the drawings and as known per se, a control yoke 10 in accordance with the invention for a clutch release bearing 11 generally comprises a pivot section 12, by means of which it pivots when operated by a control arm 13, and an operative section 14 through which it is adapted to act axially on clutch release bearing 11, on two points thereon at substantially diametrically opposed positions.

In practice, the support for the control yoke is a pivot shaft 16 supported by the casing 18 of a gearbox, being journalled in bearings 19A, 19B integral with the gearbox, for example.

At one end pivot shaft 16 projects considerably beyond casing 18. To this end is keyed a control lever 13, which may be at any angle to the axis of shaft 16.

When operated by control arm 13, as shown by the arrow F1 in FIG. 2, control yoke 10 pivots according to a plane P, hereinafter referred to for convenience as the pivot plane, represented schematically in chain-dotted outline in FIG. 1 and constituting also the cross-section plane for FIG. 2.

Pivot plane P is perpendicular to the axis of pivot shaft 16 on which control yoke 10 pivots.

Clutch release bearing 11 will not be described in detail here.

Only those constructional details necessary to an understanding of the invention will be specified, other constructional details of the clutch release bearing being well known per se and not forming part of the present application.

Generally speaking, clutch release bearing 11 comprises an operating member 27 on which control yoke 10 acts and an actuator member 28 which operates the clutch release device 29 of a clutch mechanism (not shown).

Figure 2:
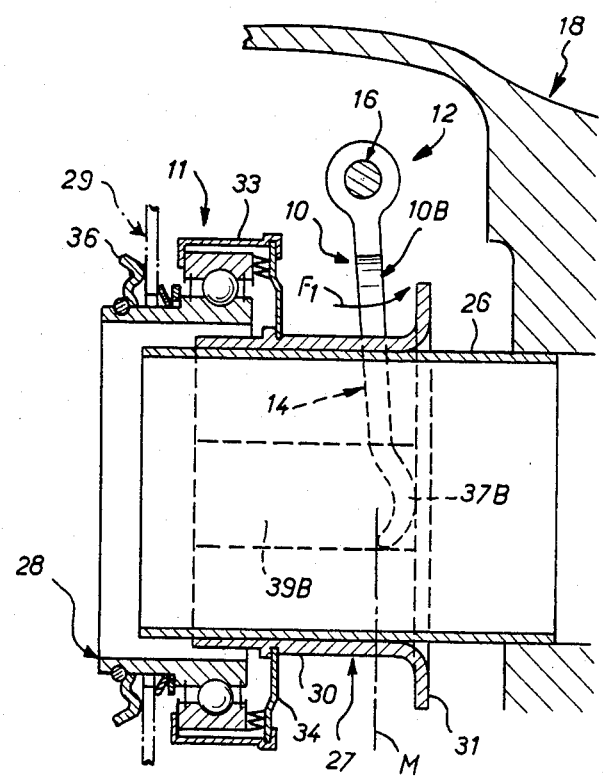
FIG. 2 is an axial cross-section through the aforementioned control yoke, the associated clutch release bearing and the corresponding casing, on the line II—II in FIG. 1

Clutch release device 29 is shown only partially in FIG. 2, in chain-dotted outline.

It may consist, for example, of the ends of the radial fingers of a diaphragm spring.

In the embodiment shown, operating member 27 of clutch release bearing 11 comprises a sleeve 30 by means of which clutch release bearing 11 slides axially on a supporting guide 26.

The latter is supported by casing 18, usually forming the "trumpet" surrounding the input shaft of the gearbox.

Operating member 27 of clutch release bearing 11 further comprises a transversely disposed bearing member on which control yoke 10 acts.

In the embodiment shown, this is a flange 31 located at some distance from actuator member 28 and which may simply consist of two arms at substantially diametrically opposed positions.

Actuator member 28 of clutch release bearing 11 is axially coupled to operating member 27 thereof, via a cover 33 attached to a flange 34 on sleeve 30 of operating member 27.

As clutch release bearing 11 is of the "pull" type, actuator member 28 of clutch release bearing 11 extends axially beyond clutch release device 29 relative to flange 31 of associated operating member 27. It features, engaged behind clutch release device 29, a member 36 whereby it is adapted to bear on the side of clutch release device 29 opposite said flange 31.

Conjointly, in order to act axially in traction on clutch release bearing 11, that is to say so as to act on clutch release bearing 11 in a direction tending to move it closer to the nearby front wall of casing 18, operative section 14 of control yoke 10 is engaged transversely over clutch release bearing 11, between flange 31 on operating member 27 and actuator member 28. In other words, it is engaged behind flange 31 of operating member 27 of clutch release bearing 11.

Operative section 14 of control yoke 10 comprises two areas 37A, 37B, referred to for convenience hereinafter as bearing areas. These act on flange 31.

In accordance with the invention, control yoke 10 is subdivided into two separate parts 10A, 10B formed respectively with bearing areas 37A, 37B of operative section 14, at least one of which is mounted so as to be moveable transversely relative to the other, according to a plane which is substantially perpendicular to pivot plane P (FIG. 1), being shown schematically in chain-dotted line in FIG. 2 under the general reference M. At least one of parts 10A, 10B, and in practice both parts, is/are mounted so as to be adjustable in position parallel to the axis of pivot shaft 16 forming the support for control yoke 10.

In practice, in the embodiment shown, part 10B is directly mounted on pivot shaft 16, which can slide parallel to its axis, being retained by a grubscrew 47.

By means of a flange 53, part 10A is mounted on a sleeve 48 threaded over and keyed to pivot shaft 16 by a key 50. Part 10A is in turn keyed to pivot shaft 16 by a key 52.

Like pivot shaft 16, sleeve 48 projects beyond casing 18 through bearing 19A. It is mounted on pivot shaft 16 so as to be adjustable in position, through the intermediary of a clamping flange 51 external to said casing 18.

It will be seen that each of parts 10A, 10B constituting the control yoke 10 in accordance with the invention forms a finger, the general configuration of which is a quarter-circle, and at the end of which is formed the corresponding bearing area 37A, 37B. Together the fingers of parts 10A, 10B form the operative section 14 of the control yoke.

In FIG. 1, clutch release bearing 11 is shown in chain-dotted outline only, by the outer perimeter C1 of flange 31 of operating member 27 and by the outer perimeter C2 of sleeve 30 of operating member 27.

As will be seen, the latter forms locally and in a manner known per se, at diametrically opposite positions, two guide surfaces 39A, 39B providing axial guidance for control yoke 10 when it pivots in pivot plane P, and angular retention of operating member 27 of clutch release bearing 11.

Clutch releae bearing 11 is actuated to move axially of the clutch mechanism with which it is associated. It is initially supported by clutch release device 29 thereof, when the clutch mechanism is moved towards casing 18 of the gearbox, in the axial direction.

In accordance with the invention, in a first stage during which said clutch mechanism and said casing 18 are still axially spaced from one another, at least one of parts 10A, 10B constituting control yoke 10, and in practice each of these parts, is moved so that it is transversely offset from the path through which clutch release bearing 11 moves when said clutch mechanism and said casing 18 are moved axially towards one another. In other words, it is moved away from its operative position.

In practice, with flange 51 of sleeve 48 released, parts 10A, 10B constituting control yoke 10 in accordance with the invention are moved parallel to the axis of pivot shaft 16 on which they are supported until they reach the separated assembly position shown in chain-dotted outline in FIG. 1.

To achieve it is only necessary to manipulate the ends of pivot shaft 16 and sleeve 48 externally of casing 18.

In practice, this separated position of parts 10A, 10B is selected so that these parts are no longer likely to interfere with flange 31 of operating member 27 of clutch release bearing 11 when the clutch release mechanism and casing 18 are moved axially towards one another.

As a second stage, at the end of this relative movement towards one another of the clutch mechanism and casing 18, as a result of which flange 31 of operating member 27 of clutch release bearing 11 moves in the axial direction past the positions of parts 10A, 10B towards the transverse wall of the nearby casing 18, parts 10A, 10B are returned to their closely spaced operative positions as shown in full outline in FIG. 1. They engage clutch release bearing 11, in contact with axial guide surfaces 39A, 39B of sleeve 30 of operating member 27 thereof.

As before, all that is necessary is to manipulate the ends of pivot shaft 16 and sleeve 48 external to casing 18, in the direction opposite to that applying previously.

Following this assembly procedure, sleeve 48 is locked against movement on pivot shaft 18 by means of flange 51.

As will be understood, the present invention is not limited to the embodiments described and shown, encompassing all variants of implementation.

Specifically, the support member of the operating member on which the control yoke bears does not necessarily constitute a flange forming part of the operating member.

It may consist of any other member coupled axially to the operating member to enable the control yoke to act indirectly thereon.

Also, the scope of the invention is not limited to "pull" type clutch release bearings, applying equally if required to "push" type clutch release bearings.

In all cases, the control yoke in accordance with the invention may be of solid construction, as specifically shown, for example, produced by diecasting, or fabricated from stamped sheet metal with stiffening edge flanges if necessary. Mounting the yoke on a pivot shaft is a particularly reliable configuration.

It is claimed:

1. In a clutch release bearing control mechanism comprising a shaft, a yoke having a pivot section pivotally mounted on said shaft and an operative section, and a control arm for rotating said yoke on said shaft, said yoke further comprises two separate parts, at least one of said separate parts is adjustable in position parallel to the axis of said shaft, each of said separate parts having on it a respective bearing area adapted to act axially on a respective area on a clutch release bearing, said areas on said clutch release bearing being at positions thereon which are substantially diametrically opposed, a sleeve being keyed to said shaft and adjustable in position axially thereon, one of said separate parts being mounted on said sleeve and the other on said shaft.

2. A mechanism according to claim 1, each of said separate parts of said operational section forms a finger which is generally quarter-circle shaped and at the end of which is the respective bearing area, said fingers together constituting said operating section of said yoke.

3. In a clutch release bearing control mechanism comprising a shaft, a yoke having a pivot section pivotally mounted on said shaft and an operative part, and a control arm for rotating said yoke on said shaft, said yoke further comprises two separate parts, at least one of said separate parts is adjustable in position parallel to the axis of said shaft, each of said separate parts having on it a respective bearing area adapted to act axially on a respective area on a clutch release bearing, said areas on said clutch release bearing being at positions thereon which are substantially diametrically opposed, said shaft being axially slidable so that each of said two separate parts is transversely mobile relative to the other.

4. A clutch release bearing control mechanism comprising a shaft, a yoke having a pivot section pivotally mounted on said shaft and an operative section having diametrically opposed bearing areas cooperable with a clutch release bearing, the improvement wherein said yoke comprises two separate parts each of said separate parts, comprising part of said pivot section and a said bearing area, at least one of said separate parts being adjustable in position parallel to the axis of said shaft between a temporary mounting/dismounting position and an operative position.

5. A control mechanism according to claim 4, together with a casing having a wall, and said sleeve and shaft extend through the wall of said casing for controlling the adjustment of the positions of said shaft and said sleeve from outside said casing.

6. A control mechanism according to claim 4, wherein each of said separate parts is adjustable in position parallel to the axis of said shaft.

7. A control mechanism according to claim 4, wherein the pivot section part of said one of said separate parts is fixed axially and pivotally to said shaft, and pivot section part of the other of said separate parts is fixed for pivotal movement with said shaft and axially slidable thereon.

8. A control mechanism according to claim 7, wherein said shaft is axially shiftable for adjusting the axial position of said one of said separate parts.

9. A control mechanism according to claim 4, wherein the pivot section part of one of said separate parts is fixed for pivotal and axial movement with said shaft, and the other of said separate parts includes a sleeve, said sleeve being received on said shaft, said sleeve being fixed for pivotal movement with said shaft and axially slidable thereon.

10. A control mechanism according to claim 9, wherein said shaft is axially shiftable for adjusting the position of said one of said separate parts.

11. A control mechanism according to claim 9, together with a casing having a wall, and said sleeve and said shaft extend through the wall of said casing so that for controlling the adjustment of the positions of the shaft and the sleeve from outside said casing.

12. A mechanism according to claim 3, each of said separate parts of said operational section forms a finger which is generally quarter-circle shaped and at the end of which is the respective bearing area, said fingers together constituting said operating section of said yoke.

13. A method of engaging an axially mobile clutch release bearing carried by a clutch mechanism with a control yoke of a control mechanism comprising a shaft, a yoke having a pivot section pivotally mounted on the shaft and an operative section having diametrically opposed bearing areas cooperable with a clutch release bearing, the yoke comprising two separate parts each of the separate parts comprising part of the pivot section and a bearing area, at least one of the separate parts being adjustable in position along the axis of the shaft, said method comprising the steps of:

first, with a transmission casing and the clutch mechanism relatively remote from each other, moving one of the separate parts parallel to the axis of the shaft so that it is transversely offset from the normal path of travel of the clutch release bearing, secondly, moving the clutch release mechanism and the casing closer together, and finally, thereafter moving the one of the separate parts parallel to the axis of the shaft in the opposite direction and into engagement with the clutch release bearing.

14. A method according to claim 13, wherein during said first and final steps of moving both of the separate parts of the yoke are moved parallel to the axis of the shaft.

* * * * *